E. A. JONES.
Fruit-Driers.
No. 151,135. Patented May 19, 1874.
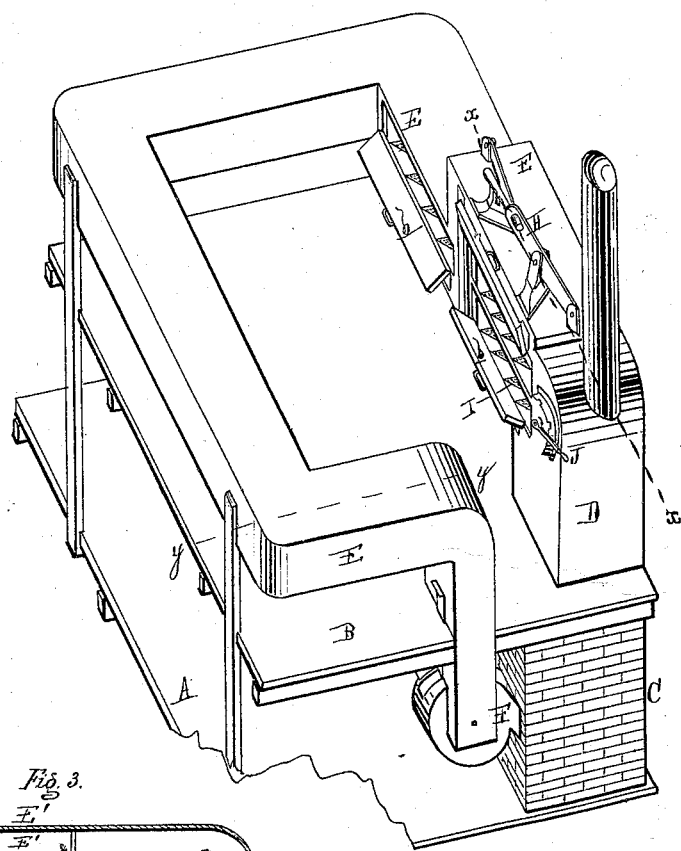
Fig. 1.
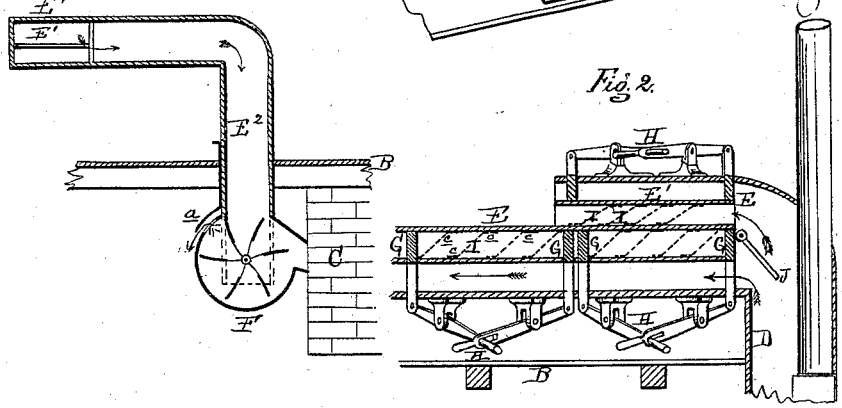
Fig. 3.
Fig. 2.
Attest:
Chas. E. Questie
Chas. J. Hunt
Inventor:
E. A. Jones
per Attorney
Thos. S. Sprague

UNITED STATES PATENT OFFICE.

EDGAR A. JONES, OF STURGIS, MICHIGAN.

IMPROVEMENT IN FRUIT-DRIERS.

Specification forming part of Letters Patent No. 151,135, dated May 19, 1874; application filed April 14, 1874.

*To all whom it may concern:*

Be it known that I, EDGAR A. JONES, of Sturgis, in the county of St. Joseph and State of Michigan, have invented an Improvement in Fruit-Driers, of which the following is a specification:

The nature of this invention relates to an improvement in that class of fruit-driers wherein the moisture of the fruit is evaporated by passing currents of heated air through the trays containing the fruit; and consists in certain peculiarities of construction to be hereinafter described and claimed.

Figure 1 is a perspective view of my fruit-drier as erected in a building, two floors of which are shown. Fig. 2 is a partial vertical section at $x$ $x$ in Fig. 1. Fig. 3 is a similar section at $y$ $y$.

In the drawing, A B represent two floors of a building, in one corner of which an air-heating furnace, C, of any suitable construction, is erected on the lower floor, the heated air from which furnace rises through a vertical trunk, D, which is closed at the top, but connected at the side with a horizontal chamber, E, extending nearly around the walls of the building. This chamber is divided by a horizontal partition, $E^1$, into two flues, one above the other, and they are subdivided into compartments by gates or valves G, which play vertically through slots cut through the partition, a few inches being left between the gates at the ends of adjacent compartments, to form a passage for the air-currents. The gates have each sufficient area to close either flue, but not both flues, which terminate in a drop-flue, $E^2$, at whose mouth is located an exhaust-fan, F, with its discharge-opening into the air-chamber of the furnace.

This fan may be rotated by a belt from a pulley on any convenient line of shafting. It is adapted to draw its supply of air from the air-chamber, and to discharge it into the heater. If the air passing to the fan be found at any time too damp to be profitably employed, any desired amount may be discharged by opening a valve, $a$, in the fan-case, and its place or volume supplied by an equal quantity of fresh air drawn directly into the furnace.

The gates G are actuated in pairs by levers H, coupled together. I are perforated screens or trays, for holding the fruit, and are slipped into the drying-compartments through the doors $b$. They are sustained at an angle of about twenty degrees, by transverse cleats $c$ at top and bottom, so that the heated currents will pass through the screens and the fruit thereon in its passage through the chamber, care being taken not to incline them so much as to have the fruit slide on the screens in the drying-flue, which may be either the upper or lower one. If the upper one, then whenever the gates G G are raised to exclude the current from any drying-compartment, it passes down under it, up through the gate-slots between it and the next one beyond, and on through to the drop-flue. When slightly charged with moisture from the fruit, and lowered in temperature, it is driven by the fan into the furnace air-chamber, where its temperature is raised, and a portion of its hydrogen is abstracted before being again circulated through the fruit-drying compartments.

In the drawing, I have shown a second chamber in part, placed on top of the chamber E, the construction of the two being precisely alike, except that the gate-levers of the upper one are on top of it, both chambers receiving the warm air from the trunk D, and delivering the same to the drop-flue $E^2$.

A valve, J, in the trunk D, is so arranged as to allow the heated current to flow into both chambers E, or to cut it off from either one that is not to be operated, or more of the current may be diverted into one than into the other.

It will be noticed that, by circulating the air in the manner described, a more complete control of the juices of the fruit is obtained; a smaller furnace and less fuel being required than in those driers in which the air is discharged into the atmosphere as soon as it has passed through or over the fruit.

What I claim as my invention, and desire to secure by Letters Patent, is—

1. The combination, in a fruit-drying apparatus, of the horizontal drying-chamber E, divided by the horizontal partition E¹, and subdivided by the gates or valves G; a heating-chamber, C; and a fan, F, located at the mouth of the drop-flue E², to create a continuous current by exhausting the air in chamber E, substantially as described and shown.

2. In combination, the gates G, operating simultaneously in pairs by means of the levers H, the chamber E, and diaphragm E¹, constructed and arranged substantially as described and shown.

E. A. JONES.

Witnesses:
H. F. EBERTS,
H. S. SPRAGUE.